Figure 1:
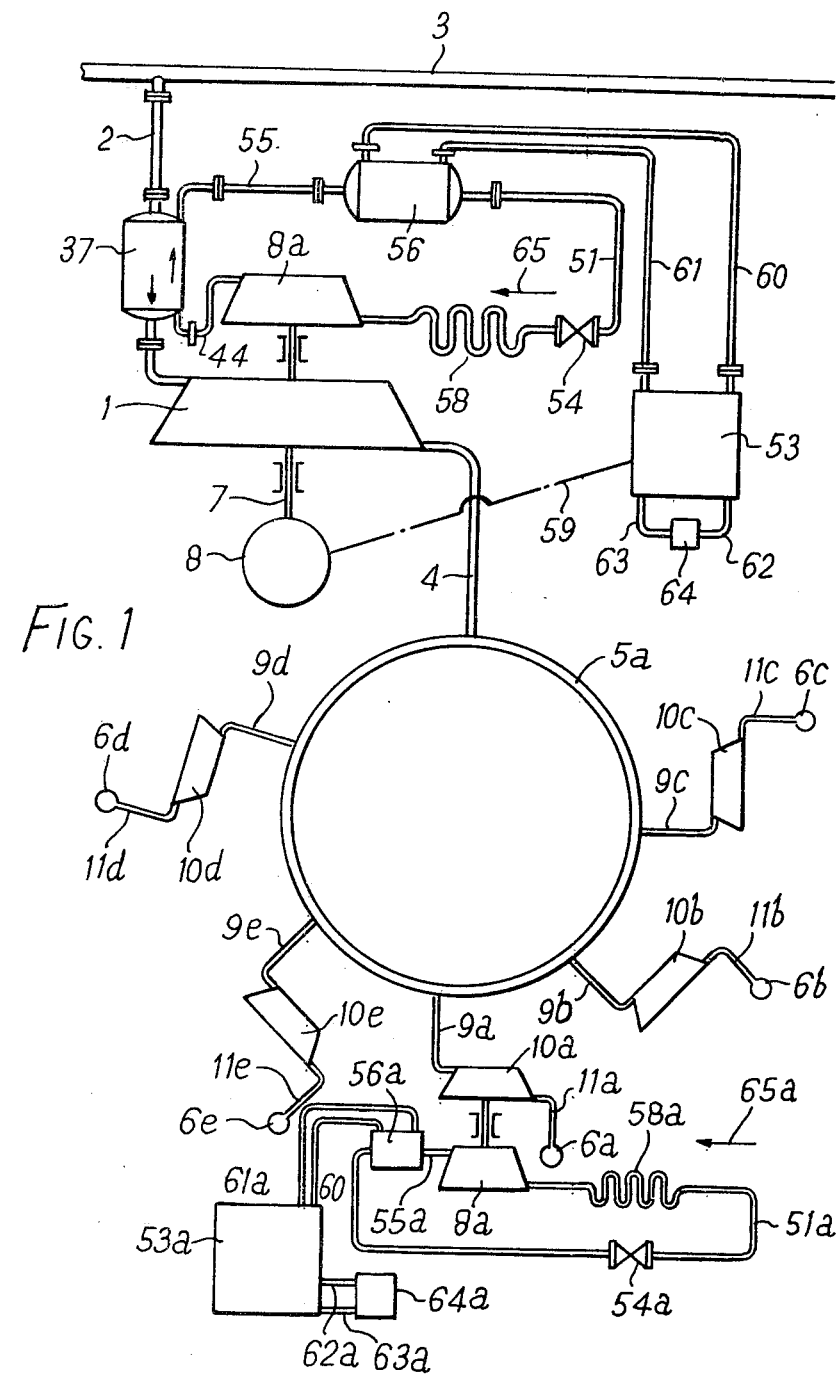

United States Patent [19]
Wenzel

[11] 4,328,674
[45] May 11, 1982

[54] POWER STATION

[76] Inventor: Joachim Wenzel, Hauptmannsreute 46, 7 Stuttgart 1, Fed. Rep. of Germany

[21] Appl. No.: 934,760

[22] Filed: Aug. 21, 1978

[30] Foreign Application Priority Data

Aug. 23, 1977 [DE] Fed. Rep. of Germany ....... 2737915
Jul. 28, 1978 [DE] Fed. Rep. of Germany ....... 2833136

[51] Int. Cl.³ .............................................. F01K 25/10
[52] U.S. Cl. .................................................... 60/648
[58] Field of Search ............... 62/52, 53; 60/651, 671, 60/648, 650, 682

[56] References Cited

U.S. PATENT DOCUMENTS

| | | | |
|---|---|---|---|
| 2,964,917 | 12/1960 | Webster | 62/53 X |
| 3,266,261 | 8/1966 | Anderson | 62/52 |
| 3,293,850 | 12/1966 | Morrison | 60/648 |
| 3,992,891 | 11/1976 | Pocnja | 62/53 |

Primary Examiner—Allen M. Ostrager
Attorney, Agent, or Firm—William A. Drucker

[57] ABSTRACT

A power station includes a main pipe for a gas under pressure, a branch pipe connected to the main pipe to receive a flow of gas, an expansion machine connected to the branch pipe for conversion of pressure energy of the gas into usable energy, a heat pump including a compressor and a heat exchanger, the compressor being coupled for operation to the expansion machine, and the heat exchanger being disposed in the branch pipe for heating the gas therein, and an electrical power generator driven by the expansion machine.

3 Claims, 3 Drawing Figures

POWER STATION

The invention relates to a power station with a turbine or expansion machine connected to the pressure line of a pressure-carrying line system, whose delivery line is connected to the consuming means of the pressure medium, whilst the expansion machine is coupled to a generator for generating electrical power or to a compressor with a series-connected intermediate accumulator.

Such a power station has the important advantage that due to the intermediate accumulator connected to the delivery line of the expansion machine, the quantities of electricity produced on an irregular basis are made regular and uniform. Furthermore, electric power can as a result be supplied at a very specific time, independent of the pressure requirements, so that there is a possibility of generating peak current. In addition, the current capacity which can be supplied can considerably exceed the maximum pressure consumption. The pressure medium is either a gas such as natural gas or liquid such as water or oil. The pressure drop is necessary and in accordance with the prior art is mainly effected by pressure reducing valves, generally in multi-stage manner.

However, a certain expenditure is involved with the feeding into the mains of the peak current obtained in accordance with the invention and this feeding into the mains becomes less economic with decreasing power station size, particularly when the distance from the consumer is great. In order to cover the heating requirements of large cities heating stations exist which either utilize the night current of large power stations or operate with a heat pump driven by means of internal combustion engines. Numerous attempts have been made to use the heat from small power stations for heating cities, but it has been found that the resulting losses in power generation and the transportation of remote heat over long distances is so costly that it can only be considered with densely populated conurbations.

In all cases, heat accumulators are used, generally constituted by thermally insulated water tanks.

The problem of the invention is to inter alia improve the power station of the above indicated type in such a way that it is not necessary to feed the power into the mains, thus making even small power stations of this type profitable.

According to the invention, this problem is solved in that the intermediate accumulator is constructed as a heat accumulator and that the generator and/or compressor is connected via corresponding lines with the heat accumulator.

In this way, the power station can mainly be used as a heating station, but this does not exclude the possibility of utilizing the power produced for other purposes in island operation. The generator can then be constructed as a direct current generator, which has the advantage that the direct current can be carried away more easily to the heat accumulator, if there is a large distance between the reducing stations and the consumer.

The possibility also exists of constructing much smaller heating stations with a known heat pump, particularly as numerous smaller reducing stations are located in proximity to the consumer. Thus, much smaller heating systems are involved, intended only for heating a single building.

The invention is described in greater detail hereinafter with reference to embodiments and to the attached drawings, wherein show:

FIG. 1 a diagrammatic representation of a first embodiment of a power station.

Figure 2:
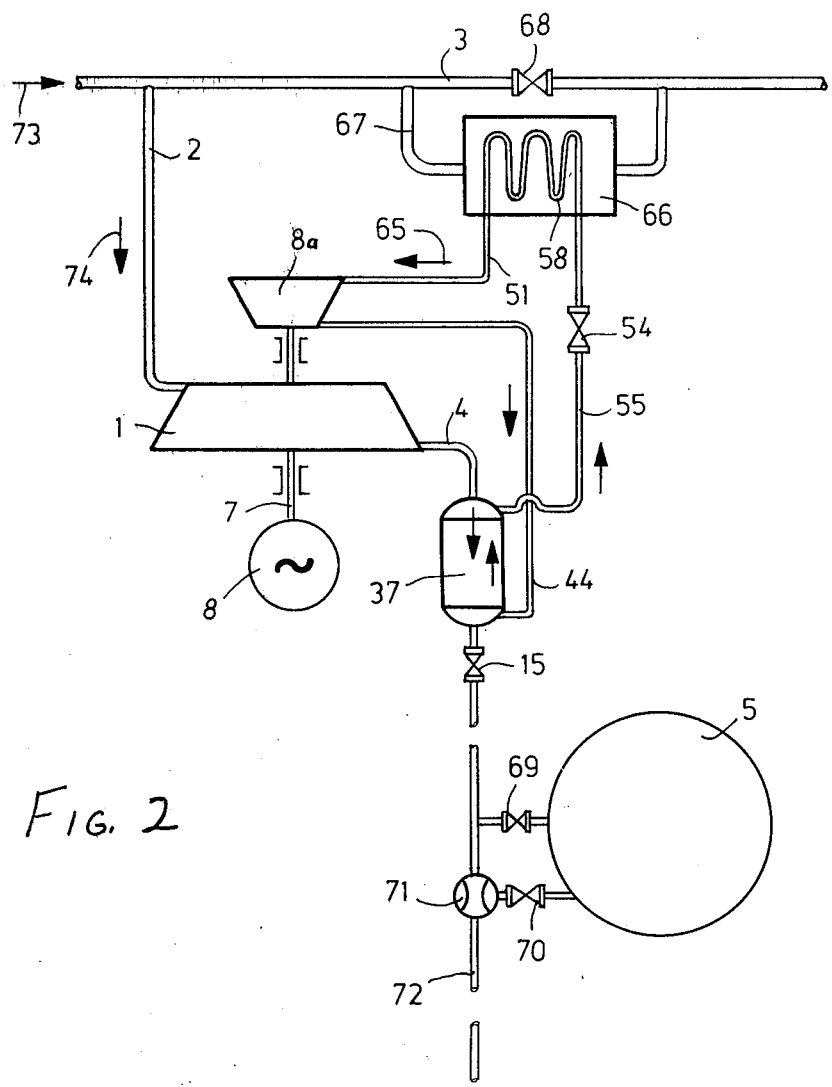

FIG. 2 a diagrammatic view of a further embodiment of a power station.

Figure 3:
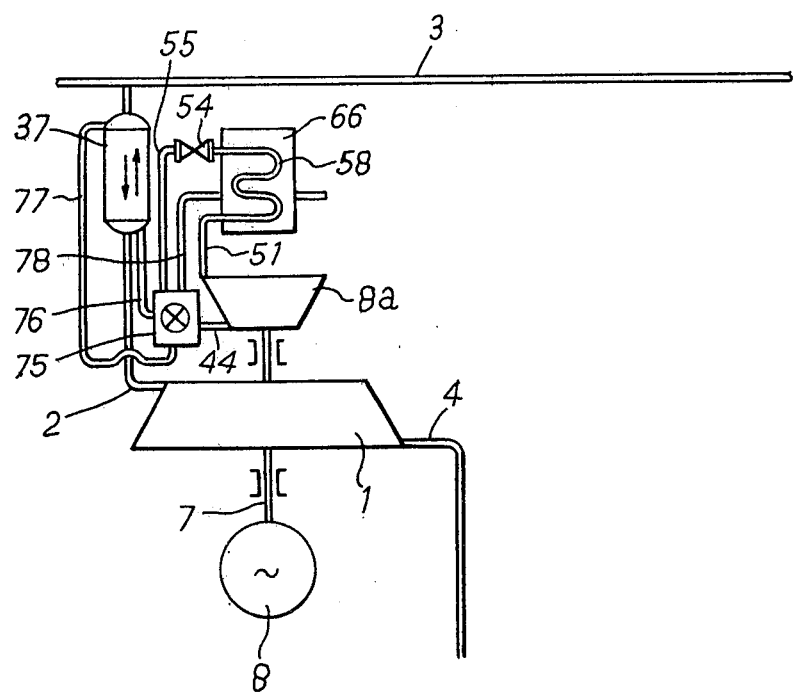

FIG. 3 a still further embodiment of the power station.

In the upper part of FIG. 1 it is possible to see the main line 3, e.g. a remote gas line which can carry a pressure of e.g. 60 bar. By means of line 2 the gas is passed at this pressure through heat exchanger 37 where it is heated and then into the turbine which expands the gas to the necessary extent, e.g. to 30 bar. At this pressure, the gas is supplied via waste line 4 to ring main 5a and from there via lines 9a to 9e to the much smaller expansion machines 10a to 10e. Finally and generally after further reductions, the gas is supplied via waste gas lines 11a to 11e to the consuming means 6a to 6e. All the pressure stages are not shown. In the case of natural gas, there are for example four different pressure stages and in each case the invention provides the possibility of using an expansion machine instead of a pressure reducing valve.

The expansion machines can either be coupled to a generator 8 or to a compressor 8a and, as shown, both a generator and a compressor can be driven. Neither the disengagable clutches in shaft 7 nor the intake valve in line 2 branching off the main line 3 with the associated regulating mechanism is shown. For example, turbine 1 may contain a known backpressure regulating device by means of which the gas in waste gas line 4 is kept substantially constant, although the pressure in main line 3 can fluctuate widely. This is obvious to the man skilled in the art, so that no more detailed explanation is necessary. Regulating equipment of this type is conventionally used on steam turbines and can be employed without difficulty in the present invention.

In the present invention, the electrical generator 8 is preferably constructed as a direct current generator because direct current can be transmitted more easily. For this purpose, the electric line 59 leading to the heat accumulator 53 and which forms part of the present power station is provided. By means of heating lines 62 and 63 the stored hot water is supplied to the consuming means 64 and in per se known manner a circuit is provided for at least partly returning the cooled water to accumulator 53. This is obvious to the man skilled in the art and requires no more detailed explanation here.

In this first embodiment, the heat pump with compressor 8a and the lines 61 and 60 can be eliminated. However, it is advantageous to incorporate the heat pump with the compressor 8a to supply the necessary heat to the heat exchanger 37 for heating the gas. In the second embodiment, only lines 60 and 61 and heat exchanger 56 are eliminated and the heat pumps and compressor 8a would be made of relatively small size.

The constructional details of the heat pump are well known to the man skilled in the art. By means of compressor 8a a heating medium, which can be e.g. air, circulating in lines 55, 44 and 51 in the direction of arrow 65 can be heated. The heated air is firstly passed through line 44 into heat exchanger 37 for heating the high pressure gas in accordance with the backpressure principle and it is subsequently fed through lines 55 and 51 to the relief valve 54. In the second embodiment, heat exchanger 56 is also omitted, so that lines 55 and 51 are interconnected without the heat exchanger. Due to the expansion by means of valve 54, there is a pronounced cooling of the heating medium, so that in area 58 of line 51 heat is extracted from the ambient. As is known, this takes place through heat being taken from the air or the ground. The heating medium slightly heated in this way is sucked in by compressor 8a, so that the heated circuit is closed.

The embodiments operating with electric power have the advantage that there can be a larger distance between the reducing station and the heat accumulator, particularly as the latter can be arranged in the immediate vicinity of the consumer.

In a third embodiment, electrical generator 8 with line 59 are completely omitted, so that the heat accumulator is heated exclusively by heat exchanger 56 in the indicated heat pump. This naturally has the advantage that the heat pump has a much higher efficiency level than the electric power for heating the water in accumulator 53. However, this embodiment is probably only advantageous when the distance between the reducing station and the accumulator 53 close to the consumer is relatively small, so that the heating medium in lines 60 and 61 does not have to be conveyed over large distances. In this case, compressor 8a is obviously made larger, just like the other above-indicated parts of the heat pump.

Therefore, this embodiment is preferred with small and very small units, such as e.g. for heating a single building. This is shown in the lower part of the drawing in which the corresponding parts are given the same reference numerals, followed by the letter a. The installation of such heat pump systems in dwellings forms part of the prior art and need not therefore be explained in detail here, particularly as it has been illustrated relative to the previous embodiment. In the case of these very small units, the consuming means 64a may be formed by heating elements.

The invention is not restricted to the represented embodiments. It is in particular possible for the large power station with turbine 1 to be constructed as a peak load station according to the main application, whilst only the much smaller power stations 10a to 10e are constructed as heating stations, because they are located in greater proximity to the consumer.

In all cases, a 100% saving of primary energy is possible, because without the present invention the expansion energy would be lost through the pressure reducing valves.

A further advantage is that it has desired environmental effects, because there is virtually no detrimental action on the environment and the noise involved can be minimised.

The intermediate accumulator in waste gas line 4 according to the main application can be completely eliminated, because in the present case the irregularities in the energy produced are compensated by the heat accumulators 53, 53a. Obviously, the man skilled in the art will provide a control mechanism which prevents overheating of the heat accumulator, as is conventionally the case in known heating stations. The man skilled in the art is also aware of the fact that when only using the heat pump, an additional heating system may be required in winter. However, the present invention provides the possibility of dimensioning the heating system in such a way that it is adequate even in winter, because an additional primary energy use substantially never takes place.

Finally, the advantage is also obtained that the heating power station according to the invention is mostly independent of the public mains. For example, the pressure in the long distance gas line 3 is generally maintained by gas turbines, so that power station according to the invention is still operational if the public power supply network fails. This provides the possibility of also using generator 8 for supplying an emergency power set in the case of necessity.

Heat exchanger 37 is generally unnecessary in the case of liquid lines, because there is virtually no cooling of water or oil due to expansion and efficiency would not be increased by heating the liquid.

In order to guarantee the independence of the regulating and control devices relative to the mains, they may be made exclusively operable by the pressure medium, as is known in this particular art. For example, the system with accumulator 53a in the lower part of the drawing can be made completely free from electrical power. It is naturally also possible for the special current of generator 8 to be used for supplying the regulating and control devices.

For the case where the power station with turbine 1 is constructed as a peak load station according to the main application, lines 4, 5a and 9 can serve as intermediate accumulators for turbine 1, as has already been proposed.

According to a fourth embodiment, a plurality of compressors with heat pumps are arranged on shaft 7 of turbine 1 or 10. For example, the generator 8 can be replaced by a much larger heat pump which is then connected with heat exchanger 56, 56a for heating the heat accumulator 53. The heat pump with compressor 8a is then connected to a heat exchanger 37 for heating the high pressure gas. This prevents cooling of the heating medium before it enters the large heat exchanger 56. Furthermore, the use of one of the heat pumps instead of an electrical generator has the not yet mentioned additional advantage that the cost of the complete plant is reduced by eliminating the electrical heating coils in heat accumulator 53, 53a. As the efficiency is also better, preference is always given to this embodiment if the distance between the reducing station and the consumer, in whose vicinity is positioned the heat accumulator 53, is not too great.

This does not limit the number of heat pumps and in fact a larger number of heat pumps or at least compressors 8a can be arranged on the same shaft 7 and can also be connected with the latter by means of disengageable clutches. If only a limited pressure gradient is available, as shown in the lower part of the drawing, and in addition only small quantities of pressure medium are consumed, a single heat pump may be adequate. Heating of the gas can be eliminated in this case, because heating has already taken place in the high pressure zone by means of heat exchanger 37. It is desirable for the natural gas to reach consuming means 6 not too greatly heated.

The disengageable clutch in shaft 7 of expansion machines 1 or 10 can also be used for disconnecting the heat pump in the summer. To enable repairs to be performed in the expansion machine, a bypass line with a pressure reducing valve can be provided, as has already been proposed.

Finally, it is also possible by means of generator 8 via line 59 not to directly heat the heat accumulator 53 by means of heating coils, but to instead provide the known heat pump, which in known manner is driven by an electric motor. The efficiency is then better than in the case of direct heating by electric power. When the special current is supplied by line 59, it is obviously possible to use this, particularly in summer, for other purposes, e.g. for operating household appliances such as washing machines, which can also be operated by direct current. The disadvantages that this type of current is automatically switched on and off at unspecified times is often acceptable with such appliances, because there is often no need to switch them on at a particular time of the day. In addition, they are generally designed in such as way that the generator usually operates during the day.

Particular preference is given to the use of the object of the invention for heating indoor swimming pools, because they have to be heated throughout the year and by day when the demand for the pressure medium, particularly natural gas, is much higher than at night.

According to another embodiment, which is not shown in the drawings, the heat exchanger 56 for heating the heat accumulator 53 is not traversed by lines 51 and 55 as shown in the drawings, but is instead traversed by waste gas line 4. It is naturally a prerequisite that the natural gas or the like is heated in a particularly pronounced manner by heat exchanger 37. The temperature level in line 4 is obviously much lower than in lines 44, 54 and 51, but this measure is recommended because the gas quantities in line 4 are significantly higher, so that through the much larger quantity there is a considerably greater heat transfer. However, it may also be necessary to slightly cool the gas in line 4 in the case of very pronounced heating by heat exchanger 37, because too great a heating of the gas and lines 4 is not permitted. In this case, a single very large heat pump 8a would be present or a number of such pumps would be connected in parallel to produce the necessary quantities of heat. As indicated hereinbefore, this simultaneously increases the capacity of turbine 1 and therefore improves the efficiency. A further advantage occurs in that the number of heat pumps can be reduced. This embodiment is readily comprehensible to the man skilled in the art without being shown in the drawings and instead of heat exchanger 56 being located in lines 55, 51 as in FIG. 1, it is located in waste gas line 4.

In addition, the possibility also exists of using the heat of such an additional heat exchanger surrounding waste gas line 4 for preheating the high pressure gas supplied to heat exchanger 37. This would mean that a further heat exchanger heating the gas in line 2 would be connected to the heat exchanger in line 4.

In general, in the latter embodiments, the pressure medium is simultaneously used as the heat source for the heat exchangers. Thus, such embodiments are still covered by the general inventive concept, even if not specifically mentioned.

As is known, heat pumps must utilise any heat sources, whose temperature should be above freezing point, even on the coldest winter days. To this end, it is known to use, e.g. for room heating purposes, ground water, the heat of the soil, external air, solar energy, water in rivers and the like.

It is particularly advantageous to use ground water or the heat of the soil, but this is very costly because when the latter is used it is necessary to lay long heat exchange coils approximately 1 to 1.5 m deep in the soil. At this depth, the temperature is relatively constant. The soil layer located above the pipe grating balances out the differing energy irradiation of the sun due to its storage action. However, for a dwelling at least 4 to 6 $m^2$ of garden or other outside surface area is required for every 100 Watt.

The use of ground water is often even more costly and is usually not even possible, because it is not possible to use ground water in a reachable depth with acceptable costs.

Outside air is admittedly available at low cost, but has the important disadvantage that it cannot generally be used on cold winter days.

In connection with the heating of indoor swimming pools and the like, the known possibility exists of recovering heat from the dirty water. However, where no such possibility exists, there is the high cost of constructing large heat pump heating stations. This also applies for the power station of the type indicated hereinbefore.

The problem of the invention is therefore to improve the power station of the above-indicated type in such a way that a relatively inexpensive heat source is used.

According to the invention, this problem is solved in that the evaporator of the heat pump is arranged in one of the lines of the pressure-carrying line system for the purpose of extracting the heat of the pressure medium from the pressure-carrying line system.

The natural gas in the known natural gas lines has, even in winter, a temperature of approximately $+4°$ C. This is due on the one hand to the fact that every so often the gas in the high pressure, long distance lines is brought to the necessary pressure by an intermediate compressor and is heated by the compression process. On the other hand, and this is the main reason, the natural gas lines are buried so deep in the soil, that at this depth the temperature is relatively constant. Furthermore, the invention can also utilize the flow in these lines, so that there is no need for an additional circulation for such a heat exchanger.

According to a further development of the invention, the pipe coil 58 of evaporator 66 is arranged in a bypass 67 of a line 3 of the pressure-carrying line system, of FIG. 2.

This provides the possibility of regulating the flow rate of the natural gas or similar pressure medium. In an extreme case, all the natural gas can be passed through the bypass through blocking the main line 3 in the vicinity of the bypass. The possibility also exists of passing only part of the pressure through the bypass 67, so that it is ensured that no inadmissible reduction of the flow rate through the line can take place. Equipment of this type is known to the man skilled in the art and need not therefore be described in detail.

According to another feature of the invention, evaporator 66 is preferably arranged on the low flow side of main line 3, so that the pressure medium flowing to the expansion machine is not used for heat extraction prior to entering said machine.

This ensures that the pressure medium supplied to the expansion machine cannot be cooled.

According to another embodiment, the pipe coil of the evaporator is arranged in a bypass of the main line or some other line. This provides the possibility of using only part of the pressure medium for heating the evaporator pipe coil, particularly as a function of the flow rate.

It would appear to be important that in the case of very high consumption in winter and at peak load periods, there is no inadmissible flow reduction and to this end the possibility exists of only passing part of the pressure medium through the evaporator in the bypass. However, the pressure flow is still sufficient in this case, because the flow rate is then correspondingly higher, so that the quantity of pressure flowing through per unit of time is kept constant due to the higher speed.

The bypass control can then relate either to the quantity flowing through per unit of time or to the through-flow rate, so that when the latter is higher a smaller proportion of the pressure medium is passed through the bypass.

The invention leads to the very important advantage that there is no need for very long pipe coils, which have to be buried in the ground. In much the same way as with the known outside air heat exchangers with forced ventilation, the pipe coils can be made of relatively limited size, because at least when the power station is operating the pressure medium always has a certain minimum speed. The possibility also exists to regulate the speed of the forced ventilation in the bypass, without any separate drive for this ventilation being required. Thus, the primary energy consumption for the forced ventilation according to the invention is zero.

The invention is obviously not limited to the use with natural gas lines. Thus, for example, water mains have the advantage that their temperature never drops below freezing point, even in winter.

However, if there should be any risk of this causing too great a throttling, it is obviously also possible to use a driven fan or circulating pump for the bypass. The drive for this is preferably derived from the turbine or expansion machine, so that no additional primary energy is required.

If the gas supplied to the turbine is heated sufficiently, as proposed hereinbefore, the waste gases 4 of turbine 1 or the expansion machine, i.e. the already expanded gas, can be used as a heat source for the heat pumps.

If the reducing station with the small power station is positioned further away from the main line, the following possibility exists. In the station, a line is branched off from the line leading to the turbine and the evaporator coil is placed in the flow of said branched line within the station. The gas removed in this way is returned to the above-indicated main line by means of an additional bypass. This leads to the economy of one line compared with the bypass arrangement, because the branch line leading to the station can be simultaneously used for supplying the heating medium. Thus, this line carries the high pressure of the main line and is, according to the invention, returned to the main line 3 by means of an injector 71. This also leads to a certain constant circulation in that through the flow in the main line the gas is drawn from this line for the heating medium flow. This measures may be necessary because over the relatively long path the pressure of the gas may have dropped slightly compared with the gas pressure in the main line.

Finally, the possibility also exists of the heat supply for heating the gas removed to be provided by a combustion process when coal or coal gas can be used. The specific energy consumption of this plant is however so low that in most cases it is simpler to burn a small part of the already expanded gas throughput in the turbine in order to cover the heat requirements. Although this involves a limited use of primary energy, this is more than compensated by the improved efficiency obtained. Preferably, the waste gases from this combustion plant can be used as a heat source for the heat pumps.

In this case, the waste gases from the combustion plant are probably rigorously circulated by a fan, unless a combustion blower is provided. This heat source is naturally similar to the external air heat exchanger with forced ventilation, with the difference that the air is significantly heated by the combustion gas or the waste gases of the combustion plant, which is particularly advantageous in winter. The installation could naturally be designed in such a way that the combustion plant was only operated on cold winter days, when not only the external air is very cold, but when there is also in general a greater demand for heat. In this case, the heat source could naturally be provided in known manner by outside air heated by waste gases on cold winter days.

In the case of liquid line systems, such as water and oil lines, there is no need to heat the liquid supplied. However, water and oil can be used as a heating source in the above-defined manner. As these liners are also buried in the ground, the cooled liquid is reheated by the soil without any costly measures being necessary.

An important economic advantage is obtained in that the mechanical energy of the expansion machine does not have to be converted into electricity and instead directly drives the heat pump.

If there is an intermediate compressor for the pressure medium in the immediate vicinity, the further important advantage is obtained that the cooler of the intermediate compressor is available as an additional heating source and preheating can be eliminated in that the gas supplied to the expansion machine is not passed through the cooler. To this end, a bypass is preferably arranged on the intermediate compressor which bypasses the cooler and the gas is passed into the turbine or expansion machine. Preference is therefore given to combining the intermediate compressor and the reducing station.

The known heat pump systems have the serious disadvantage that with economic means they only permit a relatively small temperature rise of about 50° C. However, such a rise is only adequate to heat the gas to such an extent that during expansion it does not drop below the freezing point in the case of very small pressure ratios of approximately 2. However, in general, the pressure ratio is much higher, so that the possibility then no longer exists of bringing the driving gas to e.g. 150° C. for example with a pressure ratio of 8. However, the possibility does exist of heating the gas to e.g. 60° C. with the heat pump and providing the remaining heating by the combustion system. The higher the temperature to be reached, the greater the use of primary energy.

The problem of the invention is to obviate this disadvantage and to so improve the power station of the above-indicated type that the quantity of heat to be supplied can be taken from a relatively low temperature level, even in the case of a high pressure ratio.

This problem is solved by the invention in that an apparatus for heating the waste gases is arranged in the waste gas line and immediately behind the turbine. In this way, account is taken of the fact that the waste gas temperature drops well below freezing point. The apparatus for heating the waste gases requires a relatively low temperature level, which can for example be largely or completely provided by outside air.

According to a further development of the invention, the apparatus is also used for heating the nozzles of the turbine.

If there is a high pressure ratio, it is a "cold turbine", it being necessary to heat the nozzles.

The low temperature level of the heat pump is adequate in all conceivable cases for supplying the necessary quantity of heat. Even if the gas is to be cooled to below −100° C., the hot water of a heat pump at approximately +50° C. is completely adequate to heat the gas to the necessary +10° C. As a result, there is no need to use primary energy for preheating the gas. Economic calculations have shown that, despite the limited capacity, this measure leads to a considerable reduction in costs.

The natural gas flows in the direction of arrow 73 at a pressure of e.g. 35 bar in the long distance gas line 3 of FIG. 2. Line 2 branches off line 3 in the direction of arrow 74, and in it the gas is heated in a not shown manner and generally to e.g. 34° C. by a conventional gas preheater. This gas is now supplied to turbine 1 and is expanded in a reducing station to e.g. 8 bar and as a result the gas is cooled to −25.2° C. Therefore, immediately behind the turbine in waste gas line 4 is provided an apparatus for heating the waste gases, which in this case is constructed as a heat exchanger-condenser of a heat pump. The nozzles of turbine 1 are heated by the heat of this heat exchanger, in addition to the gas in waste gas line 4.

Compressor 8a of this heat pump is coupled to shaft 7 of turbine 1 in the same way as the electricity generating generator 8. Generator 8 can be replaced by a heat pump for a heating power station.

Evaporator 66 is arranged in a bypass 67 of long distance gas line 3. For this purpose, a valve slide 68 is preferably arranged in line 3 between the two attachment points of bypass 67. If this valve 68 is closed, all the gas of line 3 is passed through bypass 67 and consequently through evaporator 66.

The reducing stations are preferably arranged as close as possible behind the intermediate compressors and then the gas is cooled to a lesser extent than hitherto behind the latter. The waste heat of the intermediate compressors can also be used in especially preferred manner for heating the gas, particularly in line 2.

The heat pump can be of completely conventional construction and can be operated with a conventional "refrigerating agent". Compressor 8a sucks the refrigerating agent through line 51 in the direction of arrow 65. The refrigerating agent, which is greatly heated in this way, is passed through line 44 into heat exchanger-condensor 37. Through condensation, heat is transferred to the waste gas in line 4, leading to reheating of the gas to e.g. min. +4° C. The liquid refrigerating agent is now fed through line 55 to expansion valve 54, after which in known manner the expanded refrigerating agent in the evaporator coil 58 of evaporator 66 absorbs heat in order to be supplied to compressor 8a again through line 51. It is readily apparent to the non skilled in the art that a low initial temperature is adequate.

The above-mentioned data even make it possible to replace the heat pump in summer by slightly heated air. An air temperature of e.g. +20° C. would be adequate in this case to heat the gas from −25.2° C. to +4° C., according to a further not shown embodiments.

Obviously, a conventional "gas preheater" can be used for this purpose which is e.g. heated with natural gas. However, this naturally leads to the disadvantage that primary energy must be used, whereas through using a heat pump, the use of primary energy is made completely unnecessary.

According to a calculation with a practical constructional embodiment, the above data lead to a maximum natural gas throughput through line 2 of 24.8 t/h, leading to an electrical terminal output of 802 kW of generator 8 if heat supply from the fuel takes place at 493 thermal kW. A primary energy saving of 75.4% is obtained in this case compared with power generation by means of a large power station with an overall efficiency of 40%. However, in calculations of the economic aspects, an important part is played by gas costs.

If in accordance with the invention, the heat pump is used, this would require in the least favourable case an output of 140 kW, leaving a useful output of 662 kW.

Calculations on the economic aspects have revealed that amortization of the small power station is possible in 15 years in both cases. However, preference must be given to the use of the heat pump, because in the years of use following the amortization period, there are no high gas costs, which are of the same order of magnitude as the annual capital ratios. Thus, the invention leads to a high profit margin.

Account is hereby taken of the fact that the period of use of the small power station is only 25%, it being assumed that it will be shut down in the six summer months due to the very low gas consumption. The summer:winter variations are e.g. 1:10.

The variations between day and night consumption figures are as large or even larger. However, such large fluctuations in consumption are undesired, because long distance gas line 3 might not be adequate in the case of very high consumption peaks to cover demands at the provided pressures and with the line cross-section. Therefore, generally intermediate gas accumulators 5 are provided, which are filled at night during the very low consumption period and are emptied by day. Therefore, at night, inlet valve 69 is opened and by day outlet valve 70 is opened with inlet valve 68 closed, so that the intermediate container 5 is emptied into line 72 via injector 71. This admittedly leads to a slight reduction in the pressure of line 72 compared with that of waste gas line 4, but this is acceptable, particularly since at the end of line 72 there are generally a plurality of pressure reducing devices connected in series and not just one device.

By a control, the possibility now exists of keeping the quantity of gas flowing in waste gas line 4 approximately constant, for which purpose a corresponding regulating device can be provided. However, it is necessary for the non skilled in the art to know beforehand the expected desired consumption. A computer is useful for determining this with maximum accuracy and into the computer are fed the data of the previous day together with the tendencies of previous years concerning the development of gas consumption.

However, the risk of line 3 becoming overloaded only exists during peak winter consumption periods. Therefore, the above-mentioned control system for keeping the gas throughput constant over the complete 24 hour period should only operate in winter. However, during parts of the year when gas consumption is low, intermediate accumulator 5 can be used in such a way that the small power station is only put into operation at peak demand periods and exclusively by day, as proposed hereinbefore. For this purpose, intermediate accumulator 5 is filled during the day by opening valve 69 to cover more than the daytime demand. At night, the small power station is shut down by closing inter alia valve 15 and the consumer is supplied exclusively by the intermediate accumulator 5. For this purpose, valve 69 can also be opened, because the injector 71 is not then required. The resulting pressure drop in line 72 can be taken into consideration in the same way as when using injector 71. Generally, in summer, nightime consumption is so low that the existing intermediate accumulators are quite adequate to supply even several times the normal nightime consumption, if required.

Furthermore, the possibility also exists, according to a further proposal of the main application, to perform the above-indicated operation by an intermediate high pressure accumulator connected in front of the station and consequently turbine 1 without thereby modifying the completely uniform removal from long distance gas line 3. In particular, the known large high pressure gas accumulators are suitable for this purpose and the possibility is provided of supplying a very large number of consumers, i.e. several cities simultaneously.

Injector 71 is preferably arranged in a bypass, so that when not in use it does not lead to a cross-sectional reduction of the gas flowing through the waste gas line 4. This not shown bypass is closed by valves when injector 71 is not in use, as is readily comprehensible to the non skilled in the art. This provides the possibility of operating the small power station throughout the year and even during the summer, namely at daytime peak load periods.

The possibility exists that the gas industry will change over to the proposed operating procedure. The above-mentioned intermediate accumulators in long distance gas lines 3 are generally provided in any case with a regulating device, so that they can be used to an increasing extent during peak demand periods. Through consultation the possibility also exists of putting the intermediate compressors into operation prior to peak demand. Line 3 itself constitutes a considerable intermediate accumulator, so that considered over the length of the line a pressure balance is possible in conjunction with the intermediate compressors if peak demand is not exceeded. With the above-mentioned high pressure ratio, it is very advantageous to construct the turbine in multi-stage manner, intermediate heating being provided behind each stage. In surprising manner, this leads to a simultaneous increase in capacity and efficiency, without it being necessary to use primary energy. The staging can be such that no temperatures below freezing point occur. This makes heating behind the final turbine stage superfluous.

Thus, the invention provides the possibility of adapting the turbine construction to the existing heat pump requirements. Multistage turbines are not only known in the gas sector and multistage steam turbines are also suitable for the purpose of the invention. If the temperature behind the turbine is made e.g. 10° C. above freezing point, the heat pump can be equipped with a single-stage compressor of conventional design in or to raise the gas temperature behind each stage only to the extent that this can be easily and economically achieved. The number of turbine stages is to be calculated on this basis, which is possible without difficulty for the non skilled in the art.

FIG. 3 shows a further embodiment having a heating source 75 which may be a steam-generator heated by burning natural gas or coal. Such steam-generators are known per se, and must not be discribed in details. Steam is pressed into heat exchanger 37 by line 76. Condensed water or colder steam runs back by line 77 into steam-generator 75 where it is heated again.

This may be supported by a heat pumping device heating the water or the air for burning the natural gas or coal in steam-generator 75. Compressor 8a presses hot fluit by line 44 into steam-generator 75 where it is used to heat the water or the air for burning the natural gas.

Further lines 55, valve 54, lines 58 and 51 of the heat pumping device have been described above. In this case, however, the heat source is represented by waste heat of boiler 75 in line 78.

In another embodiment, not shown, the hot fluid of line 44 is used to heat directly the gas in heat exchanger 37 before the gas enters the steam part thereof. So the gas will at first be heated by heat pumping device and then by steam. The temperatures of heat pumping device are lower than those of the steam.

In connection with heat pumping device a sunbeam collecting device known per se may be used also. Such are used to heat houses in wintertime in the art. Details of such device maybe same as in the prior art and need not be described. Inter alias it is the use to have a reservoir with hot water for the time when the radiation of the sun is not so strong.

I claim:

1. A power station comprising:
   (i) a main pipe for conveying a gaseous medium under pressure
   (ii) a branch pipe connected to said main pipe for receiving a flow of gaseous medium therefrom,
   (iii) an expansion machine connected to said branch pipe to receive gaseous medium under pressure therefrom, said expansion machine being operable to convert pressure energy of said gaseous medium into usable energy
   (iv) a heat pump including a compressor, an evaporator, and a heat exchanger, the compressor being coupled for operation to the expansion machine, and the heat exchanger being disposed in the branch pipe for heating of the gaseous medium therein, and
   (v) a generator of electrical power connected for operation to the expansion machine.

2. A power station, as claimed in claim 1, wherein the expansion machine includes nozzles, and wherein there is provided a heat transfer connection between the heat exchanger and the nozzles for heating of the nozzles.

3. A power station, as claimed in claim 1, wherein the evaporator of the heat pump is arranged in a bypass of said main pipe disposed downstream of said branch pipe connection.

* * * * *